(12) United States Patent
Yamada et al.

(10) Patent No.: US 6,256,179 B1
(45) Date of Patent: Jul. 3, 2001

(54) SWITCHING POWER SUPPLY APPARATUS

(75) Inventors: Tomohiro Yamada, Nagaokakyo; Akihiko Takida, Kyoto, both of (JP)

(73) Assignee: Murata Manufacturing Co., Ltd. (JP)

( * ) Notice: Subject to any disclaimer, the term of this patent is extended or adjusted under 35 U.S.C. 154(b) by 0 days.

(21) Appl. No.: 09/240,242

(22) Filed: Jan. 29, 1999

(30) Foreign Application Priority Data

Feb. 13, 1998 (JP) .................................................. 10-31393

(51) Int. Cl.$^7$ .................................................. H02H 7/00
(52) U.S. Cl. .................................................. 361/18; 361/92
(58) Field of Search .................................................. 361/18, 86, 87, 361/90, 92; 363/18–21, 56, 97, 98; 323/222

(56) References Cited

U.S. PATENT DOCUMENTS

| 4,024,437 | * | 5/1977 | Suzuki | 361/87 |
|---|---|---|---|---|
| 4,447,841 | * | 5/1984 | Kent | 361/18 |
| 4,488,210 | * | 12/1984 | Shono | 363/19 |
| 5,012,399 | * | 4/1991 | Takemura et al. | 363/18 |
| 5,675,479 | * | 10/1997 | Tani et al. | 363/19 |
| 5,943,222 | * | 8/1999 | Ogawa | 363/19 |
| 6,038,143 | * | 3/2000 | Miyazaki et al. | 363/19 |

* cited by examiner

*Primary Examiner*—Ronald W. Leja
(74) *Attorney, Agent, or Firm*—Ostrolenk, Faber, Gerb & Soffen, LLP

(57) ABSTRACT

A switching power supply apparatus comprises a transformer having a primary winding, a secondary winding, and a feedback winding; a switching element connected in series with the primary winding, a controlling circuit provided between a control terminal of the switching element and the feedback winding; a rectifying circuit connected to the secondary winding; and a protecting circuit adapted to stop the switching operation of the switching element in correspondence to an abnormality in voltage produced in the feedback winding and having the opposite polarity to the voltage produced in the feedback winding.

21 Claims, 7 Drawing Sheets

US 6,256,179 B1

SWITCHING POWER SUPPLY APPARATUS

BACKGROUND OF THE INVENTION

1. Field of the Invention

The present invention relates to a switching power supply apparatus, and more particularly, to a switching power supply apparatus employing an RCC (ringing choke converter) system.

2. Description of the Related Art

In general, for equipment and apparatus such as CRT, facsimile equipment, and so forth, a stable direct current voltage is required. In order to supply a stable direct current voltage from a commercial alternating current power supply, a switching power supply apparatus is widely used employing an RCC system of which the configuration is relatively simple and the efficiency is high.

In FIG. 6, there is shown a conventional RCC system switching power supply apparatus. In FIG. 6, the switching power supply apparatus 1 is formed of an input circuit 2, an inverter circuit 3, a voltage detecting circuit 4, and a control circuit 5.

The input circuit 2 is made up of a rectifying diode bridge DB, an AC power supply, a fuse F provided between the AC power supply and the diode bridge DB, a line filter LF, and a smoothing capacitor C1 connected across the output terminals of the diode bridge DB.

The inverter circuit 3 is made up of a transformer T having a primary winding N1, a secondary winding N2 opposite in polarity to the primary winding N1, and a feedback winding Nb having the same polarity as the primary winding N1, FET Q1 as a switching element, connected in series with the other end of the primary winding N1, a starting-up resistor R1 connected between one end of the primary winding N1 and the gate of FET Q1 as a controlling terminal, a rectifying diode D1 connected in series with the other end of the secondary winding N2, and a smoothing capacitor C2 connected between the cathode of the diode D1 and one end of the secondary winding N2.

A voltage detecting circuit 4 provided on the output side of the inverter circuit 3 is made up of a resistor R2, a light emitting diode PD on the light emitting side of a photocoupler PC, a shunt regulator Sr, is resistors R3, R4 and a Zener diode Z1. The resistor R2, the light emitting diode PD, and the shunt regulator Sr are connected in series and provided in parallel with the capacitor C2 of the inverter circuit 3. The resistors R3, R4 are connected in series with one another, and provided in parallel to the capacitor C2. The Zener diode Z1 is provided in parallel with the capacitor C2. The node between the resistors R3, R4 is connected to the shunt regulator Sr.

The control circuit 5 is made up of a resistor R5 and a capacitor C3 connected in series with each other, provided between one end of the feedback winding Nb and the gate of FET Q1, a transistor Q2 connected between the gate of FET Q1 and the other end of the feedback winding Nb, a diode D2 with its anode connected to the one end of the feedback winding Nb, a resistor R6 connected between the cathode of the diode D2 and the base of the transistor Q2 as the controlling terminal, a capacitor C4 connected between the base of the transistor Q2 and the other end of the feedback winding Nb, a resistor R7 connected in parallel to the capacitor C4, a resistor R8 and a phototransistor PT on the light reception side of the photocoupler PC connected in series with each other, provided between the cathode of diode D2 and the base of the transistor Q2, a diode D3 with its cathode connected to the one end of the feedback winding Nb, a resistor R9 and a capacitor C5 connected in series with each other, provided between the anode of the diode D3 and the other end of the feedback winding Nb, and a resistor R10 connected between the node between the resistor R9 and the capacitor C5 and the base of the transistor Q2.

The operation of the switching power supply apparatus 1 shown in FIG. 6 will now be described with reference to the graph of FIG. 7 showing the change of voltage and current in the relevant respective portions of the switching power supply apparatus 1. In FIG. 7, Vgs, V1, I1, Vds, Vbe2, Vb, V2 and I2 represent, respectively, the gate—source voltage of FET Q1, a voltage applied to the primary winding N1, a current flowing in the primary winding N1, the drain—source voltage of FET Q1, the base—emitter voltage of the transistor Q2, a voltage produced in the feedback winding Nb, a voltage produced in the secondary winding N2 and a current flowing in the secondary winding N2. ON, OFF written at the top of the graph represent the timing when FET Q1 is turned from OFF to ON (hereinafter, referred to as "turn-on") and from ON to OFF (hereinafter, referred to as "turn-off").

First, at the instant that the power supply is turned on for starting up, FET Q1 is off, so that no current flows in the primary winding N1. At that time, a current flows into the internal capacitor formed between the gate—source of FET Q1, through the starting-up resistor R1. Thereby, the gate—source voltage Vgs of FET Q1 is raised. At the time when the voltage Vgs exceeds the threshold of FET Q1, FET Q1 begins to be turned on, and then, the drain—source voltage Vds of FET Q1 becomes nearly zero. As a result, a voltage from the power supply is applied to the primary winding N1 of the transformer T, causing the current: T1 to begin to flow. Thereby, voltages Vb, V2 are produced in the feedback winding Nb, and the secondary winding N2, respectively. The voltage Vb produced in the feedback winding Nb makes a current flow into the gate of FET Q1 from the feedback winding Nb through the resistor R5 and the capacitor C3. This accelerates the rising-up of the gate—source voltage Vgs of FET Q1, so that FET Q1 is completely turned on. In this case, no current flows in the secondary winding N2, since voltage V2 produced in the secondary winding N2 is in the backward direction with respect to the rectifying diode D1.

When FET Q1 is turned on and the voltage Vb positive in polarity is produced, the capacitor C4 is charged through the diode D2, the resistor R6, and the resistor R8 and the phototransistor PT as described below, so that the voltage across the opposite ends of the capacitor C4, namely, the base—emitter voltage Vbe 2 of the transistor Q2 is raised. In this case, the charging speed (time constant) is determined by the values of the resistors R6, R7, and R8, and the capacitor C4. When the base—emitter voltage Vbe2 of the transistor Q2 is raised to exceed a threshold of the transistor Q2, the transistor Q2 is turned on. When the transistor Q2 is turned on, the collector—emitter voltage of the transistor Q2, namely, the gate—source voltage Vgs of FET Q1 becomes nearly zero, acting on FET Q1 to be turned off.

When FET Q1 begins to be turned off, the voltage V1 applied to the primary winding N1 becomes zero, and also the current I1 flowing in the primary winding N1 becomes zero. However, voltages in the secondary winding N2, and the feedback winding Nb, reverse in polarity to those applied until then, are produced, due to magnetic energy stored in the transformer T, caused by the current I1 which has flown in the primary winding N1 in the on-state of FET Q1. The current I2, caused by the voltage V2 produced in the secondary winding N2, having the reverse polarity flows through the diode D1, and is smoothed in the capacitor C2 to be outputted. The voltage Vb generated in the feedback winding Nb, having the reverse polarity, rapidly absorbs the electric charge from the internal capacitor formed between the gate and the source of FET Q1, through the capacitor C3 and the resistor R5, turning FET Q1 completely off. At the same time, the voltage Vb (feedback winding Nb) absorbs the electric charge stored in the capacitor C4, through the resistors R10, R9 and the diode D3. However, since a voltage reverse in polarity is applied to the capacitor C4, the capacitor 4, after it is discharged, is charged in the reverse direction, and the base—emitter voltage Vbe 2 of the transistor Q2 is negatively biased, resulting in the turn-off of the transistor Q2. Thus, the transistor Q2 turns on only at the instant that it triggers the turn off of FET Q1.

While FET Q1 is off, the current I2 flowing in the secondary winding N2 is reduced stepwise with release of the magnetic energy from the transformer T, and finally becomes zero. When the current I2 flowing in the secondary winding N2 becomes zero, the voltages V2 and Vb generated in the secondary winding N2 and the feedback winding Nb, respectively if they are left as they are, tend to be damped, vibrating on the baseline of zero voltage. In this case, the voltage, of which the reverse polarity is temporarily changed to the positive polarity in the feedback winding Nb, is called a kick voltage. When the kick voltage is generated in the feedback winding Nb, a current flows into the internal capacitor formed between the gate and the source of FET Q1, from the feedback winding Nb through the resistor R5 and the capacitor C3, increasing the gate-source voltage Vgs of FET Q1. If the kick voltage is higher than a predetermined value, the gate—source voltage Vgs exceeds a threshold to turn FET Q1 on. At this time, less current flows in the starting-up resistor R1, since the starting resistor R1 is set to a high resistance. Accordingly, the current flowing in the starting-up resistor R1 has no function of turning FET Q1 on. When FET Q1 is turned on, the voltages V2 and Vb generated in the secondary winding N2 and the feedback winding Nb respectively, are forced to be enhanced to the positive polarity, so that the vibration of the voltage is forcedly stopped.

After the forced stopping, the same operation as in the starting-up is repeated. That is, FET Q1 is turned on and off repeatedly, and thus, the switching power supply apparatus operates. The capacitor C4 is charged reversely in polarity when FET Q1 is off. Therefore, it takes a longer time to charge the capacitor 4 to be positive again as compared with the time required for starting-up. Thus, the on-state time-period of FET Q1 is longer in the stationary state than at starting-up.

Lastly, the voltage stabilization operation will be described. The output power is divided by the resistors R3, R4 to be detected, and is inputted into the shunt regulator Sr. The shunt regulator Sr compares the inputted voltage with its internal reference voltage, and makes a current flow which is in correspondence to the difference between the compared voltages.

When a load (not shown) connected to the switching power supply apparatus 1 is light and the output voltage is raised, the voltage at the connection between the resistors R3, R4 is increased. As a result, the input voltage to the shunt regulator Sr is increased, making a larger current start to flow. With an increased current flowing in the shunt regulator Sr, the current flowing in the light emitting diode PD of the photocoupler PC, which is connected in series with the shunt regulator Sr, is increased, with the quantity of light emitting from the light emitting diode PD increasing. With increase of the quantity of light emitting from the light emitting diode PD, a current flowing in the phototransistor PT of the photocoupler PC connected to the controlling circuit 5, is increased. The current flowing in the phototransistor PT, together with the current flowing in the resistor R6 when the voltage Vb generated in the feedback winding Nb is positive in polarity as described above, acts to charge the capacitor C4. Accordingly, when the current flowing in the phototransistor PT is increased, the time taken to charge the capacitor C4 is shortened. As a result, the time taken until the transistor Q2 is turned on is shortened, and also the time until FET Q1 is turned off, that is, the time while the FET Q1 is on, is shortened. The shortened on-state time-period of the FET Q1 reduces the magnetic energy stored in the transformer T and the voltage V2 in the secondary winding N2, resulting in lowering of the output voltage. Since the off-state time-period of FET Q1 is not changed, the switching frequency of the switching power supply apparatus 1 is increased in correspondence to a decrement in the time-period while FET Q1 is on.

To the contrary, when the load (not shown) connected to the switching power supply apparatus 1 is heavier and the output power is reduced, the current flowing in the phototransistor PT of the photocoupler PC is decreased, so that the charging time of the capacitor C4 is prolonged. The time until FET Q1 is turned off, that is, the time while FET Q1 is on, becomes longer, the voltage V2 produced in the secondary winding N2 is enhanced, and the output voltage is increased. Since the on-state time-period of FET Q1 becomes longer, the switching frequency of the switching power supply apparatus 1 is reduced.

In the above-described manner, the switching power supply apparatus 1 attempts to stabilize the voltage.

In the event that the switching power supply apparatus 1 gets to be in its overload state, for example, caused by the fact that the load becomes short-circuited or the like, the output voltage is decreased. In order to compensate for the reduction of the output voltage, the control circuit 5 operates to reduce the current flowing in the phototransistor PT and prolong the on-state time-period of FET Q1 to raise the output voltage. However, even though the current flowing into the phototransistor PT becomes substantially absent, the on-state time-period of the FET Q1 does not become longer than a predetermined time-period, since there exists a current flowing into the capacitor C4 through the resistor R6. Accordingly, the output voltage is further reduced. The voltage produced in the feedback winding Nb and opposite in polarity to the voltage Vb is proportional to the voltage V2 produced in the secondary winding N2, that is, the output voltage. Therefore, as the output voltage is reduced, the voltage opposite in polarity to the voltage Vb is reduced. The voltage produced in the feedback winding Nb and opposite in polarity to the voltage Vb has a function of charging the capacitor C4 in the reverse direction so that the time taken until the transistor Q2 is turned on is prolonged, that is, it has a function of determining the time at which transistor Q2 is turned off. Accordingly, when the voltage having the opposite polarity becomes low, the time required to charge the capacitor C4 with the current through the resistor R6 becomes short, and the turn-off of FET Q1 is caused earlier, so that the time while FET Q1 is in its on state becomes short. As a result, the operation of the switching power supply 1, though the output voltage is low, is carried out at a high switching frequency, in the state that a large current (short-circuit current) flows there. This causes problems that the device may be damaged due to abnormal heating of FET Q1, the diode D1, and the load.

On the other hand, for example, in the event that the connection between the shunt regulator Sr and the photodiode PD, for example, is disconnected in the switching power supply apparatus 1, the feedback from the output voltage detecting circuit 4 to the controlling circuit 5 is not provided, and the current ceases to flows in the phototransistor PT. Accordingly, the time-period while FET Q1 is in its on state becomes abnormally long, resulting in the abnormally high output voltage (overvoltage). In this case, the load is so protected by the Zener diode Z1 that the output voltage is not raised to exceed a predetermined value. However, if the output voltage is further increased, the Zener diode Z1 itself becomes short-circuited. Accordingly, the output voltage is reduced as in the case of the overload, and a large current flows. This causes a problem that the circuit is damaged, due to the abnormal heating of FET Q1, the diode D1, and the load.

SUMMARY OF THE INVENTION

It is therefore an object of the present invention to provide a switching power supply apparatus in which the output can be shutdown when the output voltage is abnormal, that is, when it is in its overload or overvoltage state.

According to the present invention, there is provided a switching power supply apparatus comprising a transformer having a primary winding, a secondary winding, and a feedback winding, a switching element connected in series with the primary winding, a controlling circuit provided between a control terminal of the switching element and the feedback winding, and a rectifying circuit connected to the secondary winding, further comprising a protecting circuit adapted to stop the switching operation of the switching element in correspondence to an abnormality in voltage produced in the feedback winding and having the opposite polarity to the voltage produced in the feedback winding.

According to another aspect of the present invention, the protecting circuit comprises a negative-voltage generating circuit for generating a negative voltage based on the voltage produced in the feedback winding and having the opposite polarity, an abnormal voltage detecting circuit for detecting an abnormality in the output voltage from the negative-voltage generating circuit, and a switching stopping circuit for stopping the switching operation of the switching element in dependence on the abnormal voltage detecting circuit.

According to a further aspect of the present invention, the abnormal voltage detecting circuit includes a voltage reducing detecting circuit for detecting a decrease in output voltage from the negative-voltage generating circuit.

According to a still further aspect of the present invention, the abnormal voltage detecting circuit includes a voltage rising detecting circuit for detecting an increase in output voltage from the negative-voltage generating circuit.

According to the present invention, the protecting circuit, which operates in correspondence to abnormalities in the voltages produced in the feedback winding and having the opposite polarity, detects an abnormality in the output voltage caused by overloading and an overvoltage and stops the switching operation of the switching element, causing the shutdown of the output, before a large current flows in the load. Accordingly, the unnecessary consumption of power and damage to the components by heating can be prevented.

For the purpose of illustrating the invention, there is shown in the drawings several forms which are presently preferred, it being understood, however, that the invention is not limited to the precise arrangements and instrumentalities shown.

DETAILED DESCRIPTION OF EMBODIMENTS OF THE INVENTION

Hereinafter, the preferred embodiments of the present invention are explained in detail with reference to the drawings.

Figure 1:
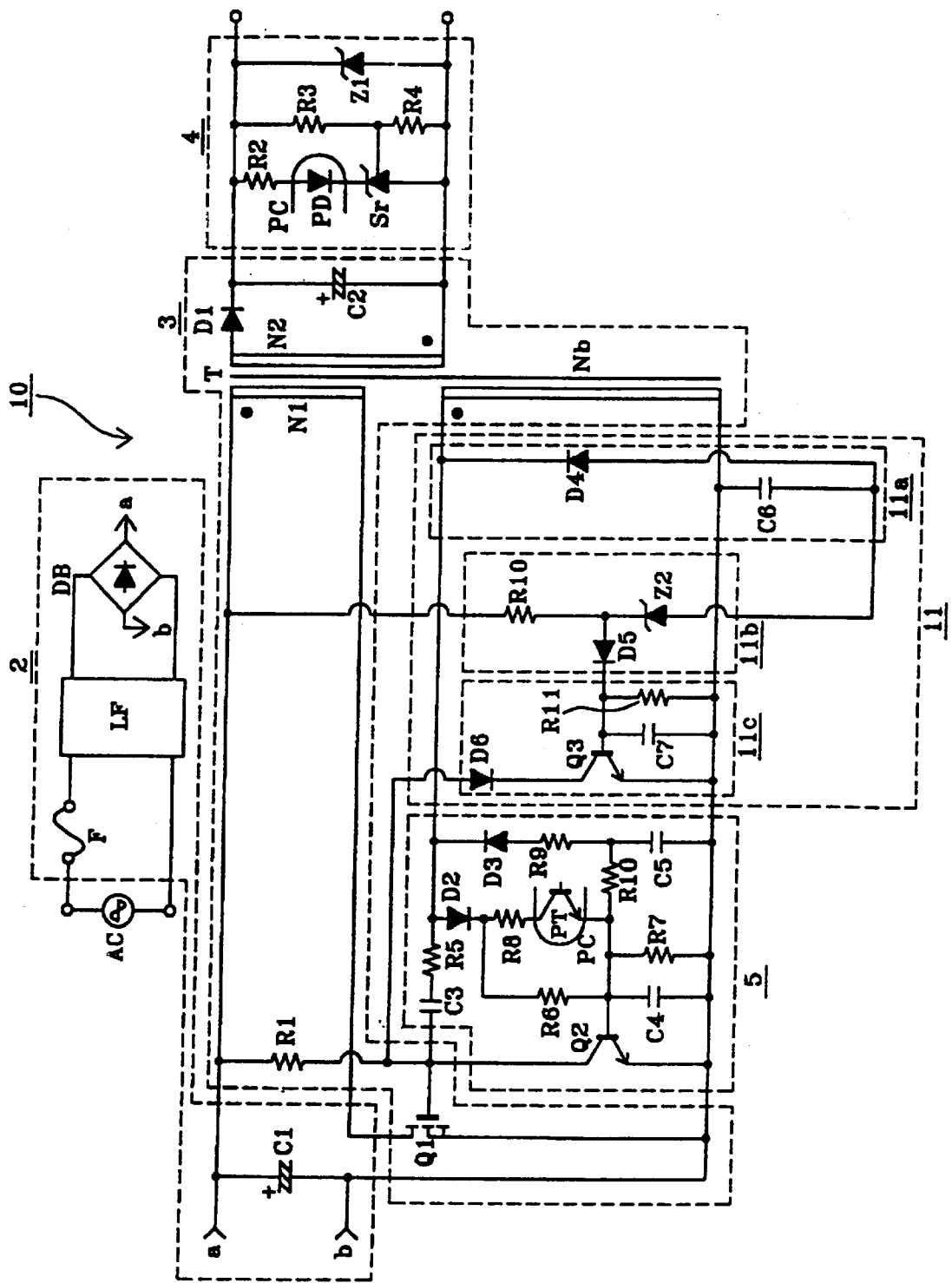
FIG. 1 is a circuit diagram showing the structure of a switching power supply apparatus according to an embodiment of the present invention.
Figure 6:
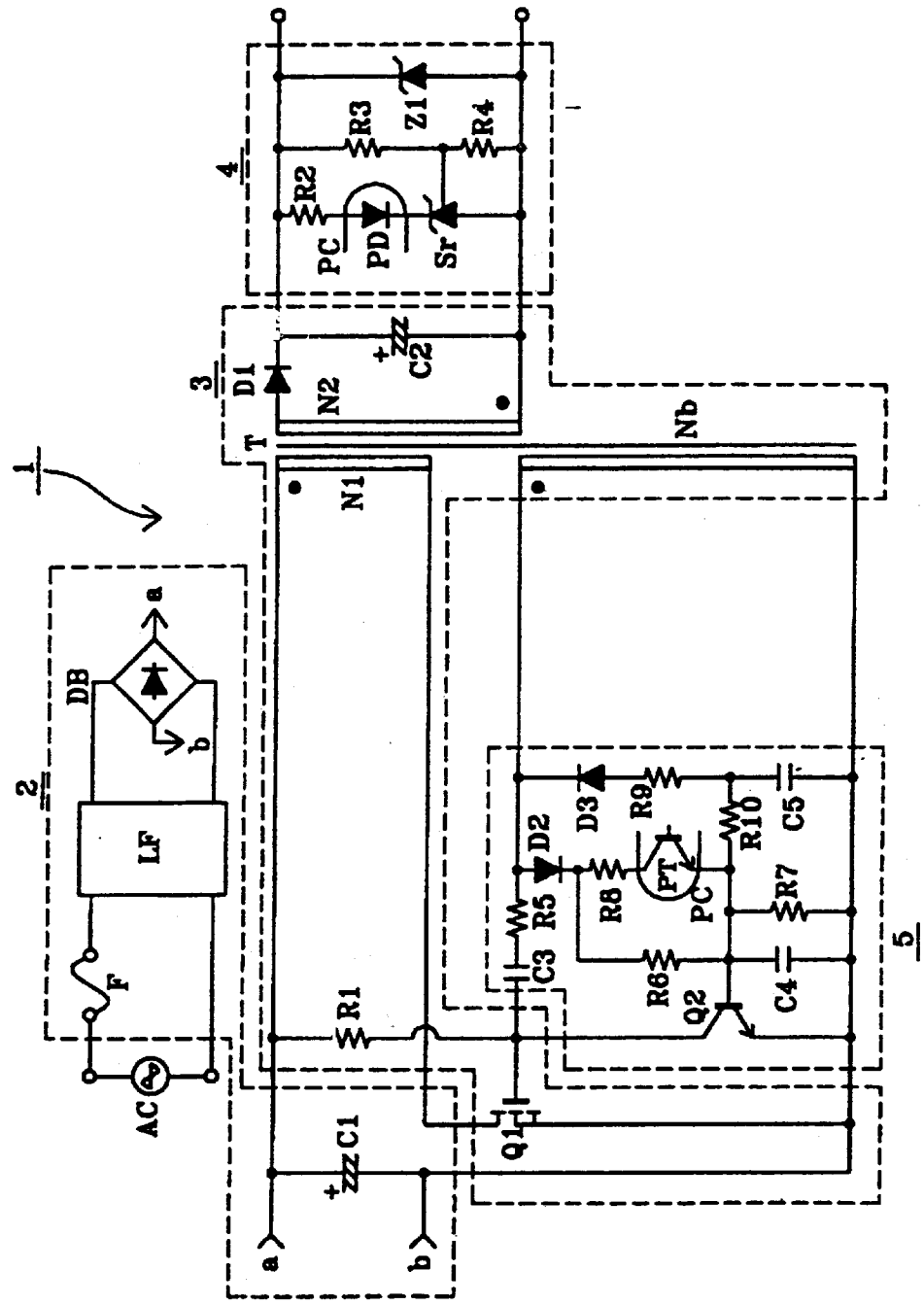
FIG. 6 is a circuit diagram showing the structure of a conventional switching power supply apparatus.
Figure 7:
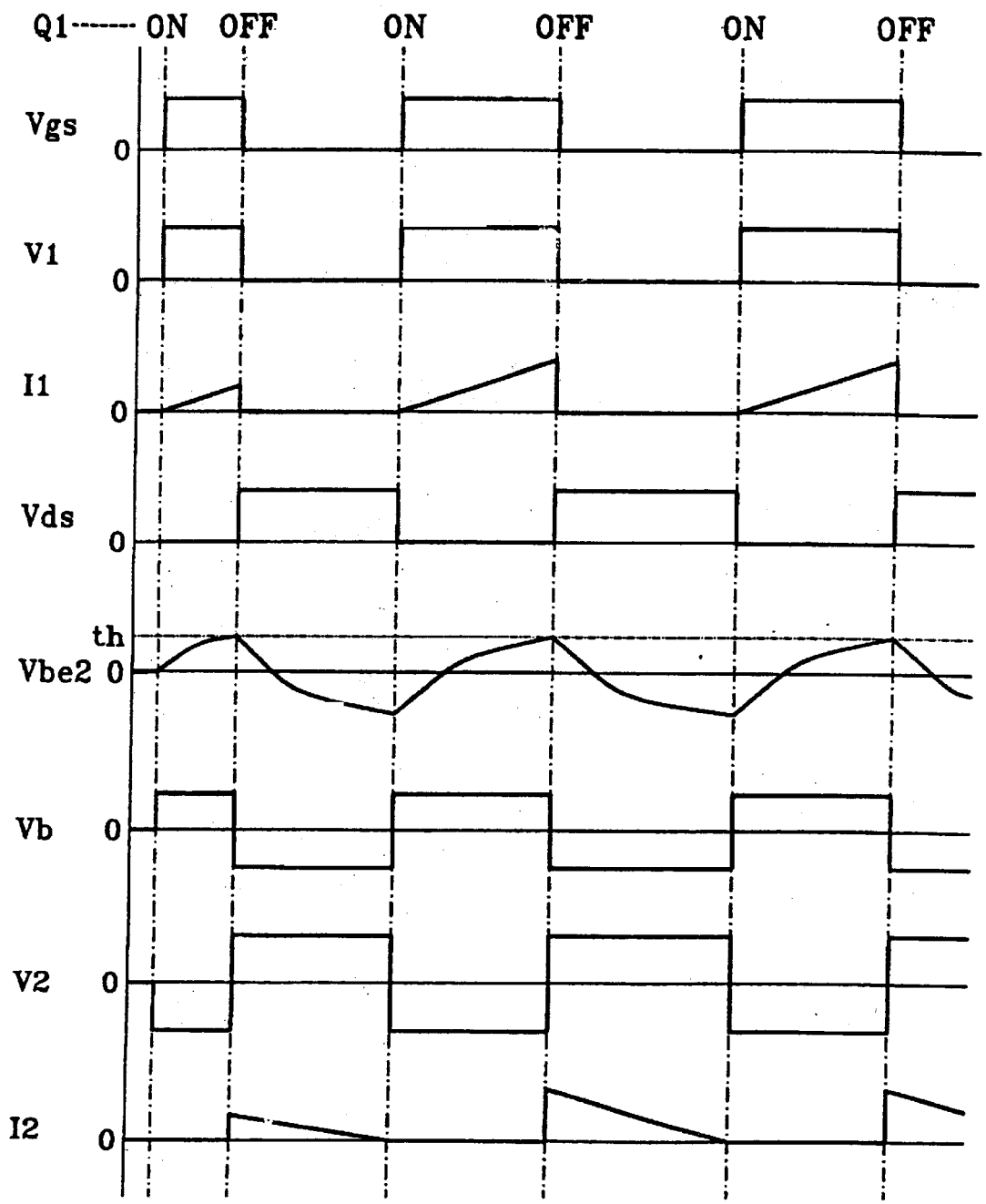
FIG. 7 is an illustration of time-dependent changes in voltage and current of the respective parts of the switching power supply apparatus of FIG. 6.

FIG. 1 shows a switching power supply apparatus of an embodiment according to the present invention. Like parts or equivalent parts in FIGS. 1 and 6 are designated by like reference numerals, and the description of the parts is omitted. The switching power supply apparatus 10 of FIG. 1 is the same as the switching power supply apparatus 1 of FIG. 6, except for the provision of a protecting circuit 11 between the switching element Q1 and the feedback winding Nb.

The protecting circuit 11 is made up of a negative-voltage generating circuit 11a, an abnormal voltage detecting circuit 11b, and a switching stopping circuit 11c. The negative-voltage generating circuit 11a comprises a diode D4 with its cathode connected to one end of the feedback winding Nb, and a capacitor C6 connected between the anode of the diode D4 and the other end of the feedback winding Nb. The abnormal voltage detecting circuit 11b comprises a Zener diode Z2 of which the anode is connected to the anode of the diode 4 as an output terminal of the negative-voltage generating circuit 11a; a resistor R10, connected between the cathode of the Zener diode Z2 and one end of the primary winding N1; and a diode D5 with its anode connected to the cathode of the Zener diode Z2. The abnormal voltage detecting circuit 11b acts as a voltage-reduction detecting circuit. The switching stopping circuit 11c comprises an NPN transistor Q3 of which the base and the emitter are connected to the cathode of the diode D5 in the abnormal voltage detecting circuit 11b and the other end of the feedback winding Nb, respectively; the parallel combination of a resistor R11 and a capacitor C7 connected across the base—emitter of the NPN transistor Q3; and a diode D6 of which the cathode and the anode are connected to the collector of the transistor Q3 and the gate of FET Q1, respectively.

Figure 2:
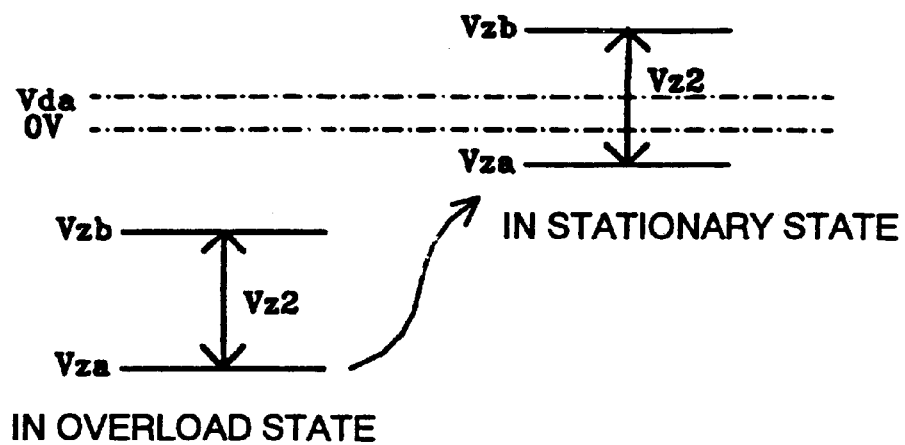
FIG. 2 illustrates changes in potentials at both terminals of the Zener diode Z2 of the switching power supply apparatus of FIG. 1.

The operation of the protecting circuit 11 will be described below with reference to FIG. 2. FIG. 2 illustrates the states of the potentials at both terminals of the Zener diode Z2 in the abnormal voltage detecting circuit 11b when the load is in its stationary and overloaded states. Vza, Vzb, Vz2, and Vda represent, respectively, the anode potential of the Zener diode Z2, the cathode potential thereof the breakdown voltage thereof, and the anode potential of the diode D5 when the diode D5 is conducting.

First, when the voltage V6 produced in the feedback winding Nb is positive in polarity in the negative-voltage generating circuit 11a of the protecting circuit 11, the voltage applied to the diode D4 is in the backward direction, so that no current flows through the negative-voltage generating circuit 11a. However, when the voltage V6 produced in the feedback winding Nb is reversed in polarity, a current flows through the diode D4 and the capacitor C6 is charged to have the opposite polarity. As a result, a negative voltage is outputted through a node between the capacitor C6 and the diode D4. The output voltage from the negative-voltage generating circuit 11a is proportional to the voltage produced in the feedback winding Nb and opposite in polarity to the voltage Vb.

When the breakdown voltage Vz2 of the Zener diode Z2 in the abnormal voltage detecting circuit 11b is set to be smaller than the sum of the absolute value of the output voltage from the negative-voltage generating circuit 11a in the stationary state and the conducting voltage (about 0.6V) of the diode D5, the Zener diode Z2 is stationarily in the its breakdown state. As the anode potential Vza of the Zener diode Z2 is equal to the output voltage from the negative-voltage generating circuit 11a, the cathode voltage Vzb is lower than the anode voltage Vda of the diode D5 when it is conducting.

In the state that the diode D5 is conducting, the base—emitter voltage of the transistor Q3 of the switching stopping circuit 11c is biased to 0 V, and the transistor Q3 is in its off-state. Accordingly, no current flows through a third diode D6 from the gate of FET Q1.

However, in the event that the load (not shown) connected to the switching power supply apparatus 10 gets to be in its overloaded state, for example, the load gets to be in its short-circuited state, the voltage V2 produced in the secondary winding N2 is reduced. The voltage produced in the feedback winding Nb and opposite in polarity to the voltage Vb is proportional to the voltage V2 produced in the secondary winding N2. Accordingly, when the voltage V2 produced in the secondary winding N2 is reduced, the voltage produced in the feedback winding Nb and opposite in polarity to the voltage Vb is reduced. As a result, the output voltage from the negative-voltage generating circuit 11a is reduced.

When the output voltage from the negative-voltage generating circuit 11a is reduced, the anode potential Vza of the Zener diode Z2 in the abnormal voltage detecting circuit 11b is raised, and the cathode potential Vzb of the Zener diode Z2, that is, the anode potential of the diode D5 is raised. When the anode potential of the diode D5 is raised to be higher than the potential Vda of the diode D5 when it is conducting, a current flows through the diode D5 into the base of the transistor Q3 in the switching stopping circuit 11c When the current flows into the base of the transistor Q3 in the switching stopping circuit 11c, the transistor Q3 gets to be in its on state. In the on state of the transistor Q3, even if there exists a current flowing into the gate of FET Q1, caused by the kick voltage produced in the feedback winding Nb and applied through the starting resistor R1, the current is absorbed in the switching stopping circuit 11c through the diode D6. Accordingly, FET Q1 is forced to be kept in the off state, the switching operation of the FET Q1 is stopped, and the output is shut down.

The case where the feedback to the controlling circuit 5 is not provided since a part of the output voltage detecting circuit 4 in the switching power supply apparatus 10, for example, the connection between the resistor R2 and the photodiode PD is disconnected, or the like, will now be described below. In this case, the voltage V2 produced in the secondary winding N2 is also raised, so that the Zener diode Z1 goes into its short-circuited state. This is the same as in the case of the overloaded state. The protecting circuit 11 operates, as in the case of the overloaded state, causing the switching operation of FET Q1 to stop, so that the output is shut down.

In the event that the output voltage is abnormally reduced and, on the contrary, is abnormally raised so that the Zener diode on the output side is short-circuited, the switching operation of FET Q1 ceases by operation of the protecting circuit 11, and the unnecessary consumption of power and damage to the components by heating can be prevented.

Figure 3:
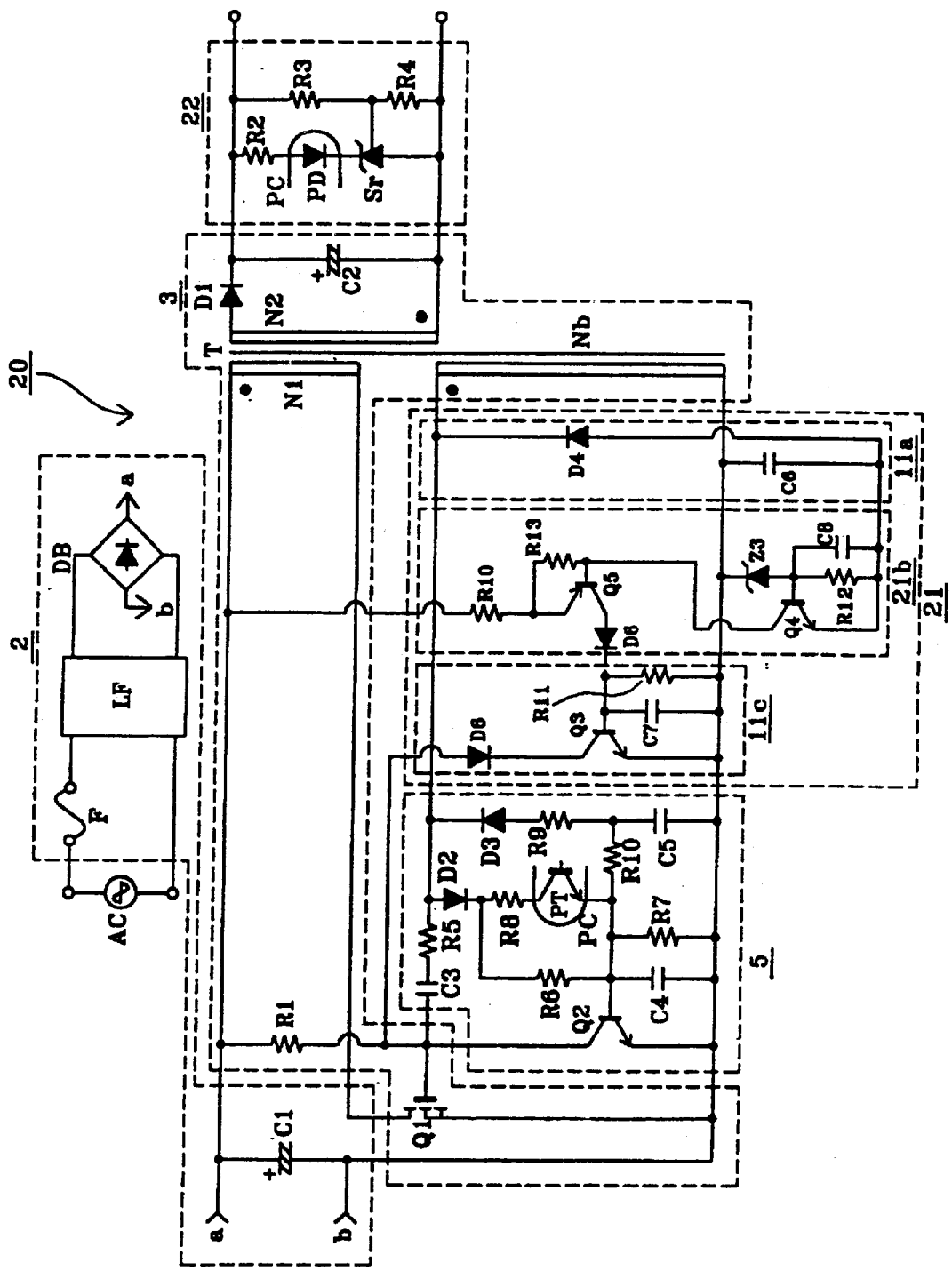
FIG. 3 is a circuit diagram showing the structure of a switching power supply apparatus according to another embodiment of the present invention.

FIG. 3 shows a switching power supply apparatus according to another embodiment of the present invention. Like or equivalent elements in FIGS. 3 and 1 are designated by like reference numerals, and the description of the like elements will be omitted below. A switching power supply apparatus 20 of FIG. 3 is the same as the switching power supply apparatus 10 of FIG. 1, except that a protecting circuit 21 is provided instead of the protecting circuit 11, and an output voltage detecting circuit 22, which is the same as the output voltage detecting circuit 4 excluding the Zener diode Z1, is provided. The negative-voltage generating circuit 11a and the switching stopping circuit 11c in the protecting circuit 21 are the same as those in the protecting circuit 11 of the switching power supply apparatus 10. The description of the circuits 11a and 11c will be omitted below.

An abnormal voltage detecting circuit 21b comprises a Zener diode Z3 with its cathode connected to the other end of the feedback winding Nb, the parallel combination of a resistor R12 and a capacitor C8 connected between the anode of the Zener diode Z3 and the anode of the diode 4 which is an output terminal of the negative-voltage generating circuit 11a, an NPN transistor Q4 with its base and emitter connected to the anode of the Zener diode Z3 and the anode of the diode D4, respectively, a resistor R13 connected to the collector of the transistor Q4, a resistor R10 connected between the resistor R13 and the one end of the primary winding N1, a PNP transistor Q5 of which the emitter and the base are connected, respectively, to the node between the resistor R10 and the resistor R13, and to the node comprising the resistor R13 and the collector of the transistor Q4, and a diode D6 with its anode connected to the collector of the transistor Q5. The abnormal voltage detecting circuit 21b acts as a voltage-rising detecting circuit. The cathode of the diode D6 is connected to the base of the transistor Q3 in the switching stopping circuit 11c.

Figure 4:
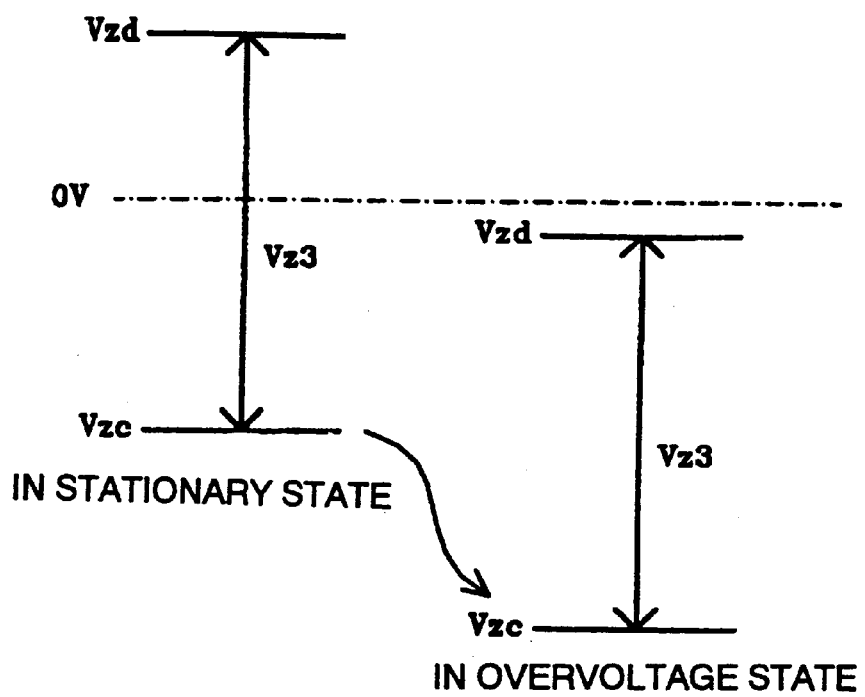
FIG. 4 illustrates changes in potentials at both terminals of the Zener diode Z3 of the switching power supply apparatus of FIG. 3.

The operation of the abnormal voltage detecting circuit 21b in the protecting circuit 21 will be described with respect to FIG. 4. FIG. 4 illustrates the potentials at both terminals of the Zener diode Z3 in the abnormal voltage detecting circuit 21b when the diode Z3 is in its stationary and overvoltage states. Vzc, Vzd, and Vz3 represent the anode potential of the Zener diode Z3, the cathode potential of the Zener diode Z3 in the condition that the diode Z3 undergoes breakdown, and the breakdown voltage of the Zener diode Z3, respectively.

The breakdown voltage Vz3 of the Zener diode Z3 in the abnormal voltage detecting circuit 21b in the protecting circuit 21 is set to be considerably higher than the absolute value of the output voltage from the negative-voltage generating circuit 11a. Therefore, the cathode—anode voltage of the Zener diode Z3 is lower than the breakdown voltage vz3 of the Zener diode Z3, so that no current flows in the Zener diode Z3, and the base—emitter voltage of the transistor Q4 remains 0 V. That is, the transistor Q4 is held off. While the transistor Q4 is off, no current flows in the resistor R13, so that the base—emitter voltage of the transistor Q5 remains 0 V, namely, the transistor Q5 is off. Thus, no current flows into the base of the transistor Q3 in the switching stopping circuit 11c through the transistor Q5 and the diode D6, so that the switching stopping circuit 11c does not operate.

In the event that a part of the output voltage detecting circuit 22 of the switching power supply apparatus 20, for example, the connection between the resistor R2 and the photodiode PD is disconnected, so that the feedback to the controlling circuit 5 is not provided, the voltage V2 produced in the secondary winding N2 is raised. The voltage produced in the feedback winding Nb and opposite in polarity to the voltage Vb is proportional to the voltage V2 generated in the secondary winding N2. Accordingly, as the voltage V2 produced in the secondary winding N2 is increased, the voltage produced in the feedback winding Nb and opposite in polarity to the voltage Vb is raised. As a result, the output voltage from the negative-voltage generating circuit 11a is increased in the negative direction.

When the output voltage from the negative-voltage generating circuit 11a is increased in the negative direction so that the absolute value exceeds the breakdown voltage Vz3 of the Zener diode Z3 in the abnormal voltage detecting circuit 21b, the cathode potential Vzd satisfying the condition that the Zener diode Z3 undergoes breakdown becomes negative, namely, becomes lower than 0 V which is the practical cathode potential of the Zener diode Z3. Thus, the Zener diode Z3 goes into its breakdown state, so that a current flows in the resistor R12 through the Zener diode Z3, and the base—emitter voltage of the transistor Q4 exceeds its threshold. Thus, the transistor Q4 is turned on. When the transistor Q4 is on, a current flows through the resistor R13, and thereby, the base—emitter voltage of the transistor Q5 exceeds its threshold, so that the transistor Q5 is turned on. When the transistor Q5 is on, a current flows into the base of the transistor Q3 in the switching stopping circuit 11c, through the transistor Q5.

When the current flows into the base of the transistor Q3 in the switching stopping circuit 11c, the switching stopping circuit 11c operates, and FET Q1 is turned off, so that the output goes into shutdown. Thus, the protecting circuit 21 operates, detecting the increase of the voltage V2 produced in the secondary winding N2. Accordingly, it is unnecessary to provide the Zener diode Z1 for the output voltage detecting circuit 22.

As seen in the above description, in the event that the output voltage is abnormally raised, the protecting circuit 21 operates, causing the switching operation of FET Q1 to stop and the output to undergo a shutdown, before a large current flows in the load. Thus, the unnecessary consumption of power and damage to the components caused by heating can be prevented. The switching power supply apparatus 20 does not cope with the overload.

Figure 5:
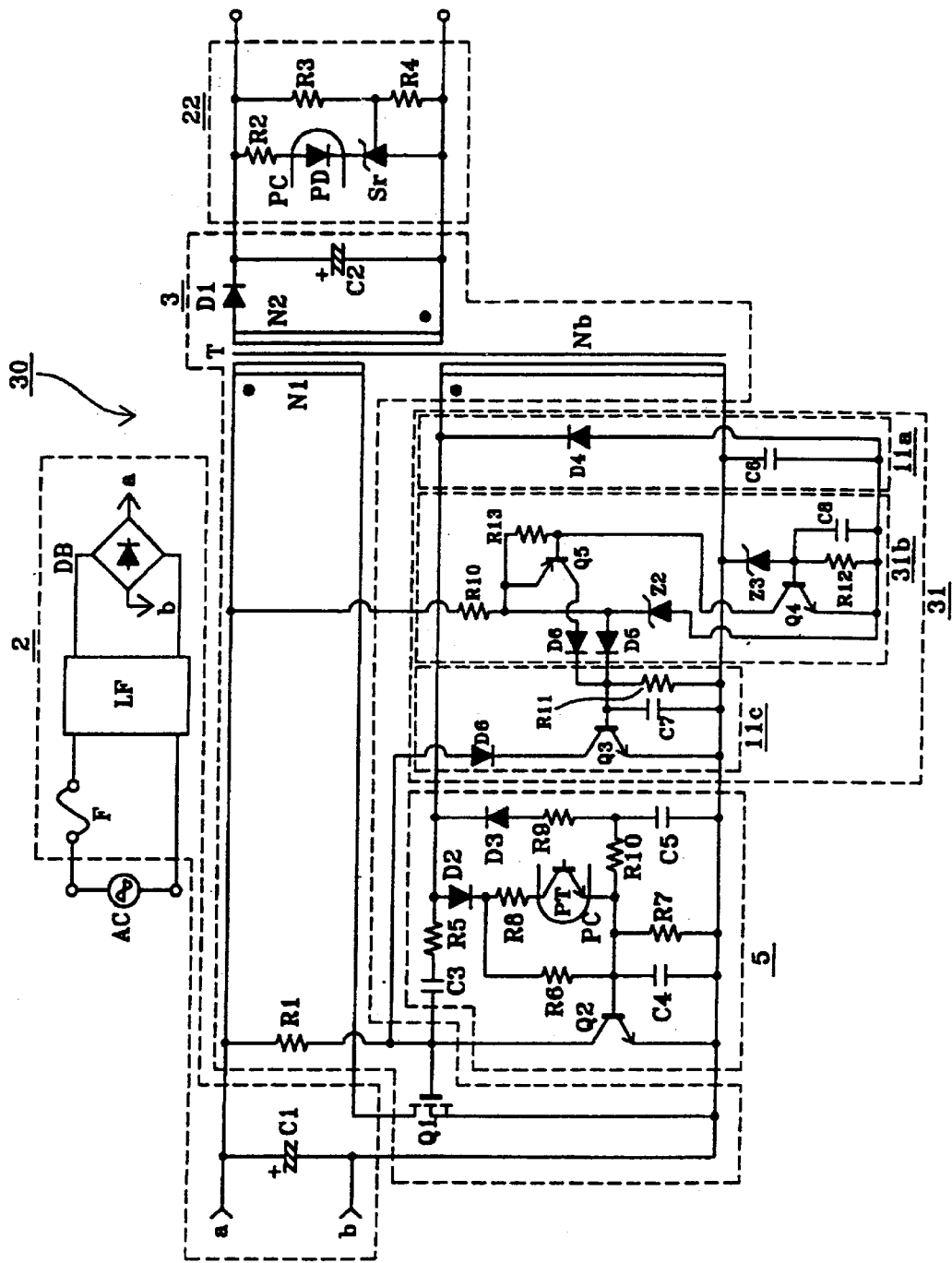
FIG. 5 is a circuit diagram showing the structure of a switching power supply apparatus according to a further embodiment of the present invention.

FIG. 5 shows a switching power supply apparatus according to a further embodiment of the present invention. Like or equivalent parts are designated by like reference numerals in FIGS. 1, 3, and 4. The description of the like parts will be omitted below.

The switching power supply apparatus 30 shown in FIG. 5 is the same as the switching power supply apparatus 20 of FIG. 3, except that an abnormal voltage detecting circuit 31b in a protecting circuit 31 includes both of the abnormal voltage detecting circuit 21b in the protecting circuit 21 of FIG. 3 and the abnormal voltage detecting circuit 11b in the protecting circuit 11 of FIG. 1. In the abnormal voltage detecting circuit 31b, the resistor R10 is commonly used for a section thereof operating as a voltage-rising detecting circuit and a section thereof operating as a voltage-lowering detecting circuit. The voltage-rising detecting circuit and the voltage-lowering detecting circuit are provided and operate independently. Accordingly, the operation is substantially the same as in the case of the switching power supply apparatus 10 and 20. The description of the operation will be omitted below.

In the switching power supply apparatus 30, with the above-described configuration, the switching operation of FET Q1 is stopped, causing the output to undergo a shutdown, in both cases of overload and overvoltage. Therefore, the unnecessary consumption of power and damage to components can be prevented. Further, in this case, both of the negative-voltage generating circuit 11a and the switching stopping circuit 11c are included in the protecting circuit 31 as countermeasures against both of overload and overvoltage. Accordingly, the number of components in the switching power supply apparatus 30 can be reduced, and costs can be saved.

While preferred embodiments of the invention have been disclosed, various modes of carrying out the principles disclosed herein are contemplated as being within the scope of the following claims. Therefore, it is understood that the scope of the invention is not to be limited except as otherwise set forth in the claims.

What is claimed is:

1. A switching power supply apparatus comprising:
    a transformer having a primary winding, a secondary wXnding, and a feedback winding, the feedback winding producing a feedback voltage in phase with a voltage across said primary winding;
    a switching element undergoing a switching operation and connected in series with said primary winding, a controlling circuit provided between a control terminal of said switching element and said feedback winding;
    a rectifying circuit connected to said secondary winding; and further comprising
    a protecting circuit adapted to stop the switching operation of said switching element in response to an abnormality in voltage produced in said feedback winding and having an opposite polarity to said feedback voltage.

2. The switching power supply apparatus of claim 1, wherein said protecting circuit comprises a negative-voltage generating circuit for generating a negative output voltage based on the voltage produced in said feedback winding and having the opposite polarity to the feedback voltage, an abnormal voltage detecting circuit coupled to the negative-voltage generating circuit for detecting the negative output voltage from the negative-voltage generating circuit, and a switching stopping circuit coupled to the abnormal voltage detecting circuit for stopping the switching operation of said switching element in dependence on an output from the abnormal voltage detecting circuit.

3. The switching power supply apparatus of claim 2, wherein said abnormal voltage detecting circuit includes a voltage reducing detecting circuit for detecting a decrease in absolute value of output voltage from said negative-voltage generating circuit.

4. The switching power supply apparatus of claim 2, wherein said abnormal voltage detecting circuit includes a voltage rising detecting circuit for detecting an increase in absolute value of output voltage from said negative-voltage generating circuit.

5. The switching power supply apparatus of claim 1, further comprising an output voltage detecting circuit coupled to the secondary winding of said transformer, and further comprising a feedback circuit coupling said output voltage detecting circuit and the controlling circuit for controlling the switching operation of said switching element in dependence on an output voltage from said secondary winding.

6. The switching power supply apparatus of claim 2, wherein said abnormal voltage detecting circuit includes a voltage reducing detecting circuit for detecting a decrease in output voltage from said negative-voltage generating circuit and further wherein said abnormal voltage detecting circuit includes a voltage rising detecting circuit for detecting an increase in output voltage from said negative-voltage generating circuit.

7. A switching power supply apparatus comprising:
a transformer having a primary winding, a secondary winding, and a feedback winding, the feedback winding producing a feedback voltage in phase with a voltage across said primary winding;
a switching element undergoing a switching operation and connected in series with said primary winding, a controlling circuit provided between a control terminal of said switching element and said feedback winding;
a rectifying circuit connected to said secondary winding; and further comprising
a protecting circuit adapted to stop the switching operation of said switching element in response to an abnormality in voltage produced in said feedback winding and having an opposite polarity to said feedback voltage;
wherein said protecting circuit comprises a negative-voltage generating circuit for generating a negative output voltage based on the voltage produced in said feedback winding and having the opposite polarity to the feedback voltage, an abnormal voltage detecting circuit coupled to the negative voltage generating circuit for detecting the negative output voltage from the negative-voltage generating circuit, and a switching stopping circuit coupled to the abnormal voltage detecting circuit for stopping the switching operation of said switching element in dependence on an output from the abnormal voltage detecting circuit; and further
wherein said abnormal voltage detecting circuit includes a voltage reducing detecting circuit for detecting a decrease in absolute value of output voltage from said negative-voltage generating circuit; and further
wherein, when an output voltage from the secondary winding decreases due to an overload, the output voltage from the negative-voltage generating circuit decreases in absolute value, causing the abnormal voltage detecting circuit to issue a signal to the switching stopping circuit to stop the switching operation of said switching element.

8. The switching power supply apparatus of claim 7, wherein the abnormal voltage detecting circuit includes a zener diode and an output of the switching stopping circuit is coupled to a control terminal of the switching element.

9. The switching power supply apparatus of claim 8, further comprising an overload protection component in said rectifying circuit connected to said secondary winding.

10. A switching power supply apparatus comprising:
a transformer having a primary winding, a secondary winding, and a feedback winding, the feedback winding producing a feedback voltage in phase with a voltage across said primary winding;
a switching element undergoing a switching operation and connected in series with said primary winding, a controlling circuit provided between a control terminal of said switching element and said feedback winding;
a rectifying circuit connected to said secondary winding; and further comprising
a protecting circuit adapted to stop the switching operation of said switching element in response to an abnormality in voltage produced in said feedback winding and having an opposite polarity to said feedback voltage;
wherein said protecting circuit comprises a negative-voltage generating circuit for generating a negative output voltage based on the voltage produced in said feedback winding and having the opposite polarity to the feedback voltage, an abnormal voltage detecting circuit coupled to the negative voltage generating circuit for detecting the negative output voltage from the negative-voltage generating circuit, and a switching stopping circuit coupled to the abnormal voltage detecting circuit for stopping the switching operation of said switching element in dependence on an output from the abnormal voltage detecting circuit;
wherein said abnormal voltage detecting circuit includes a voltage rising detecting circuit for detecting an increase in absolute value of output voltage from said negative-voltage generating circuit;
wherein when an output voltage from the secondary winding increases to an abnormal level, the output voltage from the negative-voltage generating circuit increases in absolute value, causing the abnormal voltage detecting circuit to issue a signal to the switching stopping circuit to stop the switching operation of said switching element; and further
wherein the abnormal voltage detecting circuit includes a zener diode and an output of the switching stopping circuit is coupled to a control terminal of the switching element.

11. The switching power supply apparatus of claim 10, wherein when an output voltage from the secondary winding decreases due to an overload, the output voltage from the negative-voltage generating circuit decreases in absolute value, causing the abnormal voltage detecting circuit to issue a signal to the switching stopping circuit to stop the switching operation of said switching element.

12. A switching power supply apparatus comprising:
a transformer having a primary winding, a secondary winding, and a feedback winding, the feedback winding producing a feedback voltage in phase with a voltage across said primary winding;
a switching element undergoing a switching operation and connected in series with said primary winding, a controlling circuit provided between a control terminal of said switching element and said feedback winding;
a rectifying circuit connected to said secondary winding; and further comprising
a protecting circuit adapted to stop the switching operation of said switching element in response to an abnormality in voltage produced in said feedback winding and having an opposite polarity to said feedback voltage;

wherein said protecting circuit comprises a negative-voltage generating circuit for generating a negative output voltage based on the voltage produced in said feedback winding and having the opposite polarity to the feedback voltage, an abnormal voltage detecting circuit coupled to the negative-voltage generating circuit for detecting the negative output voltage from the negative-voltage generating circuit, and a switching stopping circuit coupled to the abnormal voltage detecting circuit for stopping the switching operation of said switching element in dependence on an output from the abnormal voltage detecting circuit;

wherein said abnormal voltage detecting circuit includes a voltage rising detecting circuit for detecting an increase in absolute value of output voltage from said negative-voltage generating circuit; and further wherein when an output voltage from the secondary winding increases to an abnormal level, the output voltage from the negative-voltage generating circuit increases in absolute value, causing the abnormal voltage detecting circuit to issue a signal to the switching stopping circuit to stop the switching operation of said switching element.

13. A method of controlling a switching power supply apparatus, the apparatus including a transformer having a primary winding, a secondary winding, and a feedback winding, the feedback winding producing a feedback voltage in phase with a voltage across said primary winding; a switching element undergoing a switching operation and connected in series with said primary winding, a controlling circuit provided between a control terminal of said switching element and said feedback winding; and a rectifying circuit connected to said secondary winding; the method comprising the steps of:

detecting a voltage produced in said feedback winding and having an opposite polarity to the feedback voltage; and stopping the switching operation of said switching element in response to an abnormality in the voltage produced in said feedback winding and having an opposite polarity to said feedback voltage.

14. The method of claim 13, wherein the step of detecting comprises:

generating a negative output voltage based on the voltage produced in said feedback winding and having an opposite polarity to the feedback voltage;

detecting the negative output voltage; and providing the negative output voltage to the controlling circuit to stop the switching operation.

15. The method of claim 14, wherein said step of detecting the negative output voltage comprises:

detecting a decrease in absolute value of the negative output voltage.

16. The method of claim 14, wherein said step of detecting the negative output voltage comprises detecting an increase in absolute value of the negative output voltage.

17. The method of claim 16, wherein when an output voltage from the secondary winding increases to an abnormal level, the negative output voltage increases in absolute value and further comprising issuing a signal to stop the switching operation of said switching element when the negative output voltage increases above a predetermined threshold.

18. The method of claim 14, wherein said step of detecting the negative output voltage comprises detecting a decrease in absolute value of the negative output voltage and further comprises detecting an increase in absolute value of said negative output voltage.

19. The method of claim 13, further comprising detecting an output voltage of the secondary winding of said transformer, and further comprising controlling the switching operation of said switching element in dependence on the output voltage from said secondary winding.

20. A method of controlling a switching power supply apparatus, the apparatus including a transformer having a primary winding a secondary winding, and a feedback winding, the feedback winding producing a feedback voltage in phase with a voltage across said primary winding; a switching element undergoing a switching operation and connected in series with said primary winding, a controlling circuit provided between a control terminal of said switching element and said feedback winding; and a rectifying circuit connected to said secondary winding; the method comprising the steps of:

detecting a voltage produced in said feedback winding and having an opposite polarity to the feedback voltage;

stopping the switching operation of said switching element in response to an abnormality in the voltage produced in said feedback winding and having an opposite polarity to said feedback voltage;

wherein the step of detecting comprises:

generating a negative output voltage based on the voltage produced in said feedback winding and having an opposite polarity to the feedback voltage;

detecting the negative output voltage;

providing the negative output voltage to the controlling circuit to stop the switching operation;

wherein said step of detecting the negative output voltage comprises:

detecting a decrease in absolute value of the negative output voltage; and further wherein, when an output voltage from the secondary winding decreases due to an overload, the negative output voltage decreases in absolute value and further comprising issuing a signal to stop the switching operation of said switching element when the negative output voltage decreases below a preset threshold.

21. A method of controlling a switching power supply apparatus, the apparatus including a transformer having a primary winding, a secondary winding, and a feedback winding, the feedback winding producing a feedback voltage in phase with a voltage across said primary winding; a switching element undergoing a switching operation and connected in series with said primary winding, a controlling circuit provided between a control terminal of said switching element and said feedback winding; and a rectifying circuit connected to said secondary winding; the method comprising the steps of:

detecting a voltage produced in said feedback winding and having an opposite polarity to the feedback voltage; and stopping the switching operation of said switching element in response to an abnormality in the voltage produced in said feedback winding and having an opposite polarity to said feedback voltage;

wherein the step of detecting comprises:

generating a negative output voltage based on the voltage produced in said feedback winding and having an opposite polarity to the feedback voltage;

detecting the negative output voltage; and providing the negative output voltage to the controlling circuit to stop the switching operation;

wherein said step of detecting the negative output voltage comprises detecting a decrease in absolute value of the negative output voltage and further comprises detecting an increase in absolute value of said negative output voltage; and further wherein when an output voltage from the secondary winding decreases due to an overload, the negative output voltage decreases in absolute value and further comprising issuing a signal to stop the switching operation of said switching element when the negative output voltage decreases below a preset threshold and further wherein when an output voltage from the secondary winding increases to an abnormal level, the negative output voltage from the negative-voltage generating circuit increases in absolute value, and further comprising issuing a signal to stop the switching operation of said switching element when the negative output voltage increases above a predetermined threshold.

* * * * *